April 5, 1955     A. PANAGROSSI ET AL     2,705,691
LAMINATION OR COATING OF FLUORINE-SUBSTITUTED
POLYETHYLENES WITH OR ON OTHER SUBSTANCES
Filed Jan. 6, 1953

INVENTORS
A. Panagrossi
R. L. Hauser
BY Rockwell & Bartholow
ATTORNEYS

United States Patent Office 2,705,691
Patented Apr. 5, 1955

2,705,691

LAMINATION OR COATING OF FLUORINE-SUBSTITUTED POLYETHYLENES WITH OR ON OTHER SUBSTANCES

Ahmed Panagrossi, North Haven, Conn., and Ray L. Hauser, Litchfield, Ill., assignors to The Connecticut Hard Rubber Company, New Haven, Conn., a corporation of Connecticut Application January 6, 1953, Serial No. 329,808

4 Claims. (Cl. 154—48)

This invention relates to the lamination or coating of fluorocarbon plastics, and more specifically fluorine-substituted polyethylenes with or on other substances, and it also deals with a method of treating these plastics so that they can be bonded and formed into laminates or surface coatings.

This application is a continuation in part of our application Serial No. 246,448, filed September 13, 1951.

Certain plastic polymers containing fluorine as a part of their composition possess extraordinary toughness and resistance to heat, cold, erosion, abrasion, solvents, weathering, and chemical attack, but by reason of the fact that they are also highly resistant to wetting by water, solvents, cements and adhesives of every known kind, it has been impossible in the past to use them in forming laminates or coatings such as mentioned above.

One of the objects of the present invention is to provide for the successful use of these fluorine-substituted polyethylenes in the production of laminates and coatings.

Another object is to provide new methods and products involving fluorine-substituted polyethylenes as laminating layers or coatings.

Figure 1:
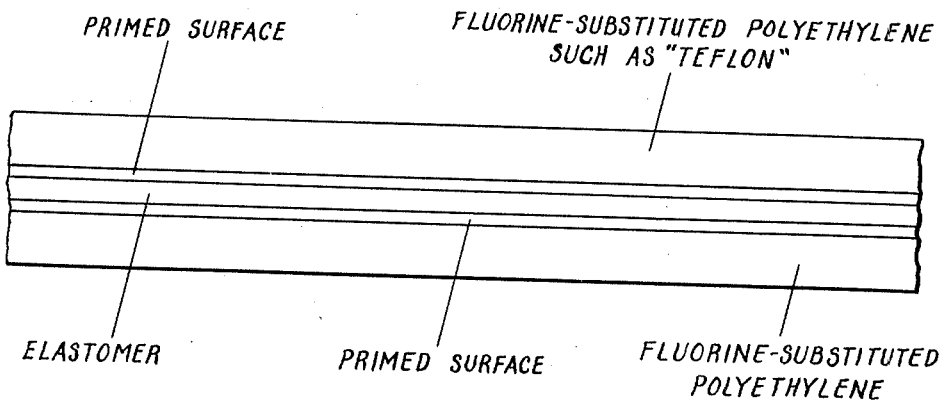
Figure 2:
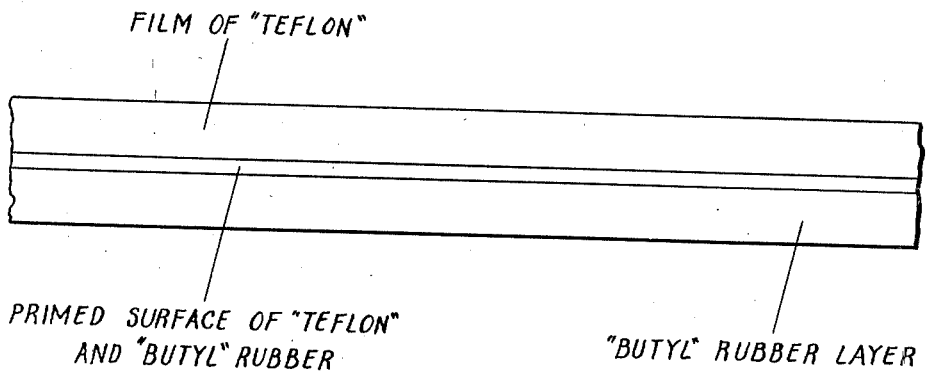

In the accompanying drawing:

Fig. 1 is a diagrammatic view showing layers of fluorine-substituted polyethylene with an interposed layer of elastomer; and Fig. 2 is a diagrammatic view showing the application of a layer of fluorine-substituted polyethylene to a layer of "Butyl" rubber.

The property of high resistance to solvents and destructive agents is characteristic of polymerized organic fluorine compounds, and more especially fluorine-substituted polyethylene. For example, tetrafluoro-ethylene, in other words,

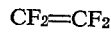

yields the polymer known commercially under the trademark "Teflon," which is a product of E. I. du Pont de Nemours & Co. Similarly fluorine-and-chlorine-substituted ethylene, in other words, trifluoro-monochloro-ethylene, having the formula

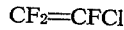

when polymerized, yields the commercial product known under the trade-mark "Kel-F", which is manufactured by M. W. Kellogg Co. While these two plastics differ from each other in some ways, they both possess the advantageous characteristics mentioned above, and both offer the same resistance to bonding by ordinary methods and adhesives. An object of the present invention is to overcome the resistance to bonding offered by these and similar fluorine-substituted polyethylenes.

In the following description, the trade-mark names of the plastics in question are used in some places for brevity's sake.

As will appear from the following description, the new method of bonding these plastics to other substances such as rubber comprises the step of applying to the surface of the plastic as a priming coating a coating or layer which is a composite of the plastic and particles of uncured rubber, then giving the coating layer a heat treatment which cures the rubber therein and fuses the composite to the fluorine-substituted polyethylene plastic in a manner to provide a strongly adherent layer having the necessary adhesive properties, after which uncured rubber is applied to the adhesive layer, and the uncured rubber cured or vulcanized. The fluorine-substituted polyethylene is in the form of a thin film and this is laminated to a thin layer of a synthetic rubber compound containing a copolymer selected from the group consisting of isobutylene-isoprene and isobutylene-butadiene.

The procedure involved in carrying out the invention will be made clear by the following examples:

Example 1

A 50% dispersion of "Teflon" particles in water was brushed onto two clean sheets of "Teflon." Then a solution of 14.5% "butyl" rubber in benzene was brushed on and dried, and the sheets again dried at room temperature. This rubber was a copolymer of isobutylene and isoprene. The composite layer containing particles of the two substances was then subjected to heat by placing the sheets in a radiant-heat oven and subjecting them to 715° F. for three minutes so as to cure the rubber particles and fuse the composite layer to the surface of the plastic.

After cleaning off the loose carbon from the treated surfaces of the sheets, uncured "butyl" rubber compound was applied to the surfaces and the sheets arranged in juxtaposed relationship to form a laminate with an interposed body or core of "butyl," as shown in Fig. 1 of the drawing. This laminate was then subjected to pressure for condensing it and to heat for vulcanizing, the pressure being 500 lbs. per square inch for a period of five minutes, and a temperature of 310° F. being applied for thirty minutes.

Bond strength between the "Teflon" sheath of this composite and the core of "butyl" rubber was found by the peel test to be 3.6 lbs. per inch.

Using the same procedure, natural rubber was laminated to "Teflon" with a bond strength of 3.3 lbs. per inch, and neoprene was laminated to "Teflon" with a bond strength of 1.5 lbs. per inch.

Example 2

To 100 grams of a 50% dispersion of "Teflon" in water was added 100 grams of a 50% dispersion of "butyl" rubber cement in toluene, and the mixture was stirred and thinned by the addition of toluene until a proper spreading consistency was obtained. This mixture was then brushed onto the clean surface of a film of "Teflon" having a thickness of 0.0035 inch, so as to form a coating having a thickness of approximately 0.002 inch. The "Teflon" film was then heated for three minutes at 715° F. so as to fuse the coating on the plastic, as in the previous example.

The next step was to apply an uncured "butyl" (GRI) rubber compound to the composite adhesive layer, which in this case was done by calendering, and the layer of rubber calendered on the film had a thickness of approximately 0.0035 inch. The "butyl" rubber compound in this particular case had the following formulation, which was the same as that of the cement above mentioned:

| | Parts |
|---|---|
| "Butyl" rubber (GRI) | 100 |
| Zinc oxide | 5 |
| Stearic acid | 3 |
| Sulfur | 3 |
| Accelerator | 2 |
| Carbon black | 50 |

The laminate was then placed in an hydraulic press and subjected to a pressure of 500 lbs. per square inch.

The uncured rubber layer was then cured by subjecting it to a temperature of 300° F. for five minutes. Such a laminate is shown in Fig. 2.

The bonding strength was substantially as indicated in the preceding example.

Example 3

To 100 grams of a 50% solution of "butyl" rubber in toluene was added 100 grams of a 50% dispersion of "Kel-F" in xylene. The mixture was stirred to promote uniformity and then applied by brushing to a film of "Kel-F" having a thickness of 0.0025 inch. The mixture or composite coating was then fused on the "Kel-F" surface by placing the article in an oven provided with air circulation, and holding it at a temperature of 450° F. for fifteen minutes. The surface coating was approximately 0.0015 inch. A layer of uncured "butyl" rubber compound having the formulation referred to in the next preceding example was then calendered into place over the adhesive layer on the plastic to form a layer about 0.004 inch thick and the rubber layer was cured substantially in the manner indicated in the next preceding example.

Example 4

A 50% dispersion of "Kel-F" particles in xylene was brushed onto the clean surface of a thin film of "Kel-F" and the film dried at room temperature. A solution of 50% "butyl" rubber in benzene was then sprayed on and dried. The composite layer containing particles of the two substances was then fused by application of 480° F. for ten minutes. Uncured "butyl" rubber compound was then applied to the "Kel-F" film in such thickness as to provide a laminate in which the plastic and the rubber had substantially equal thickness, both, however, being in the form of a thin film of less than 0.002 inch. The laminate was condensed by application of pressure of 500 lbs. p. s. i., and for curing a temperature of 310° F. was used for thirty minutes.

Laminates of the character hereinbefore described are of great advantage in providing a resistant covering affording protection against highly corrosive chemicals such as nitric acid, aniline, mixed acid, 90% hydrogen peroxide, furfural alcohol, ethyl alcohol, hydrazene, anhydrous, ammonia, and various vesicant liquids. The laminate can be produced as a continuous film, the rubber dough being laid on the plastic by calendering and the layers being so strongly bonded or welded together that they cannot be separated by any mechanical means. Where, as in the last three examples, the laminate consists of a layer of fluorine-substituted polyethylene supported by a layer of "butyl" rubber, the product is in the form of a film which can be made very thin but which, nevertheless, by reason of the character of the plastic or resin used for the outer layer, has excellent resistance to the chemicals mentioned above. At the same time the laminate is soft and flexible and is admirably adapted to fabrication into a wide variety of items such as protective garments, including coats, trousers, hats, boots, and aprons, and also for other items such as diaphragms, gaskets, and tank linings, etc. "Butyl" rubber lends itself particularly well to such fabrication for the reason that the rubber itself can be compounded to yield soft, flexible, extensible stocks which can be calendered, spread or sprayed upon the film. Further, such rubber may be adhered readily to a wide variety of substances, such as metals, other rubbers and elastomers and plastics, by commercially available adhesives. In this fashion, through an intermediate layer of "butyl" rubber, it is possible to provide articles clad with the fluorine-substituted polyethylene film. The "butyl" layer further provides a means whereby sheets of the laminate may be joined one to the other in a lap-type seam. Lengths of such laminate can be readily connected with other lengths to make a complete suit which will completely protect the wearer from injury due to contact with nitric acid and the other chemicals mentioned above. The laminate also has the great advantage that the material is flexible over a wide temperature range and can be used at temperatures as low as —50° F., while permitting storage safely at temperatures as high as 160° to 180° F.

The resistance of the material to chemical attack was tested in the manner now to be described, this specific illustration being that used for testing the resistance to nitric acid.

A beaker is filled with 1% potassium iodide solution to which are added 3 drops of starch indicator. The thin flexible material to be tested is applied over the top of the beaker, with the fluorocarbon layer uppermost, and held firmly in place by a rubber band. An open glass tube, 3 centimeters in diameter and approximately 10 inches high, is pressed downwardly against the upper face of the film and fuming nitric acid is placed inside of the tube. If the vapor or acid passes through the film, the indicator in the beaker below turns purple or brown. When tested in this manner films of the kind referred to in the last three examples have shown no permeability to fuming nitric acid after a contact period of 24 hours.

The "butyl" rubber which forms a part of the laminate provides a flexible support for the plastic layer and adds considerably to the mechanical strength of the laminate. A major advantage of the "butyl" layer, however, resides in its resistance to the passage or leakage of air or gas, in other words, its dense and impermeable character. This, in combination with its flexibility, makes this kind of rubber especially suitable for the intended purpose, and, of course, the resilience imparted to the laminate by this rubber is very desirable in many cases.

Some of the important applications of these laminates or other articles produced in accordance with the invention are:

Corrosion-resisting linings for receptacles;
Diaphragms subject to high or low temperature;
Inert gaskets and packings made elastic by including a layer of elastomer;
Non-wettable coatings for the radio antennas of submarines;
Non-wettable and non-icing coatings for helicopter blades and other airplane parts;
"Printed" electrical circuits;
Erosion-resistant layers for airplane wings;
Non-adhesive surfaces for mills, mixers, heaters, heat sealers, conveyors, presses, and molds;
High-temperature electrical insulation and shielding;
Composite laminates combining the resistance of the plastic with the resilience of the protected elastomer;
Articles of clothing providing protection against various chemicals.

It is understood that the examples given above are illustrative only, and that various changes in the detail procedure are within the scope of the invention.

Unless it appears otherwise from the context, the term "rubber" is used herein in a broad and general sense.

What we claim is:

1. A laminate of fluorine-substituted polyethylene plastic and a cured rubber compound containing rubber selected from the group consisting of isobutylene-isoprene and isobutylene-butadiene, both members of the laminate being thin films.

2. A laminate as defined in claim 1, in which the fluorine-substituted polyethylene plastic is in the form of a film having a thickness of less than 0.006 inch.

3. A laminate as defined in claim 1, in which the polyethylene plastic is in the form of a film having a thickness of the order of 0.0035 and in which the rubber layer adhered to the film has a comparable thickness.

4. A laminate comprising a film-like layer of fluorine-substituted polyethylene plastic, a film-like layer of a cured rubber compound in which the rubber is selected from the group consisting of isobutylene-isoprene and isobutylene-butadiene, and a bonding layer between the first-mentioned layers which is a composite of fluorine-substituted polyethylene and rubber.

References Cited in the file of this patent

UNITED STATES PATENTS

| | | |
|---|---|---|
| 2,484,483 | Berry | Oct. 11, 1949 |
| 2,484,484 | Berry | Oct. 11, 1949 |
| 2,597,976 | Cousins | May 27, 1952 |

FOREIGN PATENTS

| | | |
|---|---|---|
| 660,398 | Great Britain | Mar. 28, 1949 |